(12) United States Patent
Wang et al.

(10) Patent No.: US 11,109,463 B1
(45) Date of Patent: Aug. 31, 2021

(54) LIGHTING DRIVING CIRCUIT AND METHOD FOR REMOVING INRUSH CURRENT IN LED CHANNELS

(71) Applicant: CONSUMER LIGHTING (U.S.), LLC, Norwalk, CT (US)

(72) Inventors: Frank Wang, Shanghai (CN); Xin Zhou, Shanghai (CN); Fanbin Wang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 16/888,996

(22) Filed: Jun. 1, 2020

(51) Int. Cl.
| | |
|---|---|
| *H05B 45/37* | (2020.01) |
| *H05B 45/10* | (2020.01) |
| *H05B 45/40* | (2020.01) |
| *H05B 45/46* | (2020.01) |
| *H05B 45/20* | (2020.01) |
| *H05B 45/50* | (2020.01) |
| *H05B 45/3725* | (2020.01) |

(52) U.S. Cl.
CPC .......... *H05B 45/46* (2020.01); *H05B 45/20* (2020.01); *H05B 45/3725* (2020.01); *H05B 45/50* (2020.01)

(58) Field of Classification Search
None
See application file for complete search history.

(56) References Cited

U.S. PATENT DOCUMENTS

| | | | |
|---|---|---|---|
| 6,285,139 B1* | 9/2001 | Ghanem | H05B 45/10 |
| | | | 315/291 |
| 2014/0035462 A1* | 2/2014 | Kumada | H05B 45/50 |
| | | | 315/127 |

* cited by examiner

*Primary Examiner* — Dedei K Hammond
(74) *Attorney, Agent, or Firm* — Wood IP LLC

(57) ABSTRACT

Provided is a lighting driving circuit for supplying power to a plurality of LED channels, having an input-output synchronous switch circuit synchronously connected to an input and an output of the lighting driving circuit, a rectifier circuit, a power conversion circuit, a power output having an output capacitor, and a discharge circuit connected to the switch circuit and an input end of the rectifier circuit and to the output capacitor. The plurality of LED channels are connected between the power output and the switch circuit, and the switch circuit is configured to simultaneously perform a switching operation of the power supplied to the plurality of LED channels to remove any inrush current to the LED load and send a sense signal to the discharge circuit to discharge the output capacitor.

19 Claims, 6 Drawing Sheets

LIGHTING DRIVING CIRCUIT AND METHOD FOR REMOVING INRUSH CURRENT IN LED CHANNELS

I. TECHNICAL FIELD

The technical field relates generally to a lighting control system. In particularly, a system and method for control of a lighting (e.g., LED) driving circuit using an input-output synchronous switch system and a discharge circuit for removing inrush current in LED channels of an LED load.

II. BACKGROUND

In an LED lighting system having one or more LED channels, a control system is provided for adjusting the correlated color temperature (CCT) or switching the color of one or more LED channels of an LED load via a lighting driving circuit. During normal operation, the LED load and lighting driving circuit are in an open state and the lighting power supply is receiving power from an external power source. The output voltage across the lighting driving circuit is greater than the voltage at the LED load. A switch is typically used to perform a color temperature adjustment operation. When the switch is actuated, the output voltage of the lighting driving circuit is higher than the voltage at the LED load, and a voltage flicker may occur due to an inrush current, thereby causing unwanted damage to the LEDs.

It is desirable to provide a system and method for removing the inrush current at the LED channels.

III. SUMMARY OF THE EMBODIMENTS

The various embodiments of the present disclosure are configured to provide a lighting driving circuit that includes an input-output synchronous switch circuit and a discharge circuit for removing inrush current at the LED channels in a LED load.

In one exemplary embodiment, a lighting driving circuit is provided for supplying power to an LED load comprising a plurality of LED channels. The lighting driving circuit includes an input-output synchronous switch system including a switch circuit and synchronously connected to an input and an output of the lighting driving circuit, a rectifier circuit comprising a rectifier bridge for converting AC power to DC power, a power conversion circuit connected to an output end of the rectifier circuit for conversion of the DC power, and a power output comprising an output capacitor connected to an output end of the power conversion, wherein the plurality of LED channels are connected between the power output and the switch circuit of the input-output synchronous switch system, and the switch circuit is configured to simultaneously perform a switching operation of the power supplied to the plurality of LED channels to remove any inrush current to the LED load.

In another exemplary embodiment, a lighting driving circuit is provided for supplying power to an LED load comprising a plurality of LED channels. The lighting driving circuit includes an input-output synchronous switch system including a switch circuit and synchronously connected to an input and an output of the lighting driving circuit, a rectifier circuit comprising a rectifier bridge for converting AC power to DC power, a power conversion circuit connected to an output end of the rectifier circuit for conversion of the DC power, a power output comprising an output capacitor connected to an output end of the power conversion, and a discharge circuit connected to the switch circuit and an input end of the rectifier circuit and to the output capacitor of the power output. The plurality of LED channels are connected between the power output and the switch circuit of the input-output synchronous switch system, and the switch circuit is configured to simultaneously perform a switching operation of the power supplied to the plurality of LED channels to remove any inrush current to the LED load and sends a power-off sense signal to the discharge circuit to discharge the output capacitor.

In another exemplary embodiment, a method for removing inrush current in LED channels within the above-mentioned system is provided.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
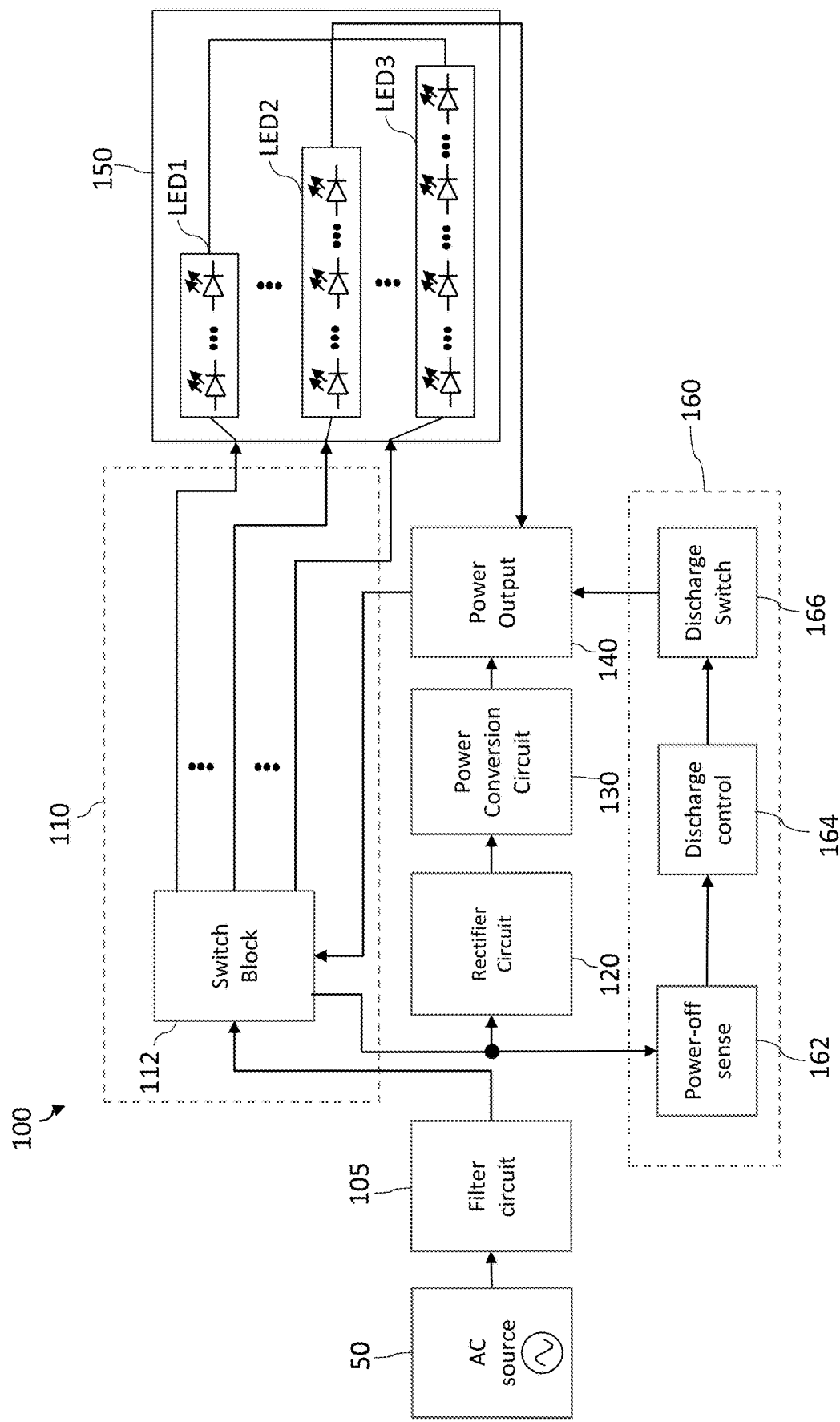
FIG. 1 is a block diagram of the lighting driving circuit including an input-output synchronous switch system and discharge circuit according to one or more exemplary embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 2:
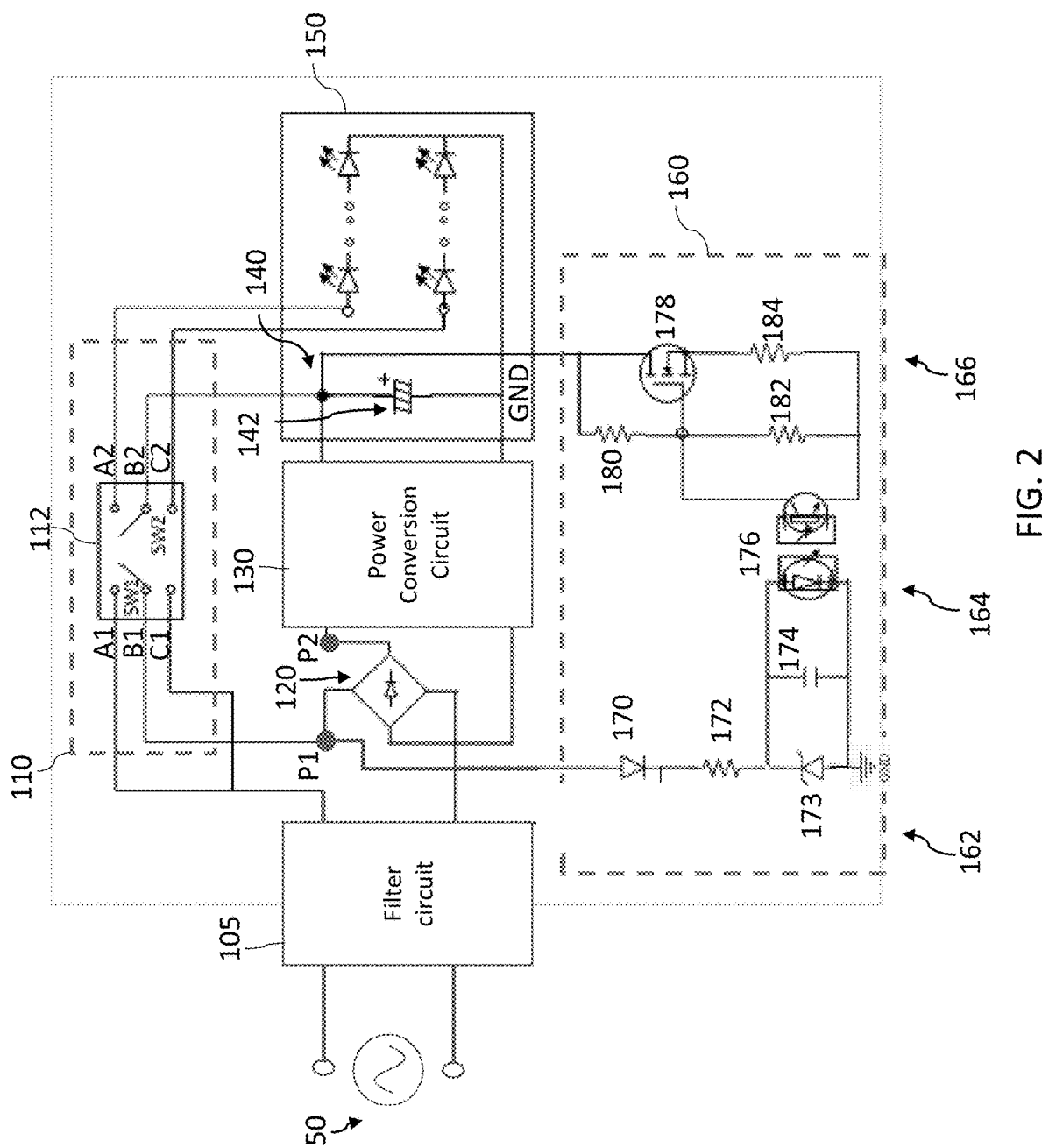
FIG. 2 is a circuit schematic illustration lighting driving circuit of FIG. 1 according to one or more exemplary embodiments of the present invention.

Exemplary embodiments of the present invention provide a lighting driving circuit and a method for removing inrush current in one or more LED channels. FIGS. 1 and 2 is are a block diagram and schematic view of an example of a lighting driving circuit 100 for which the embodiments of the present invention can be implemented. As shown in FIG. 1 a lighting driving circuit 100 is provided.

The lighting driving circuit 100 includes a filter circuit 105, an input-output synchronous switch system 110 including a switch circuit 112, a rectifier circuit 120 comprising a rectifier bridge (as depicted in FIG. 2) for converting AC power to DC power. Also included is a power conversion circuit 130, power output 140, LED load 150 including a plurality of LED channels or branches LED1, LED2 and LED3. According to some embodiments, the lighting driving circuit 100 can further include a discharge circuit 160 including a power-off sense circuit 162, a discharge control circuit 164 and a discharge switch circuit 166.

According to embodiments of the present invention, the input-output synchronous switching system 110 can be used with or without the discharge control circuit 164.

As shown, the lighting driving circuit 100 is connected to an AC power source 50. The first input terminal of the filter circuit 105 is connected to the Neutral (N) terminal of the AC power source 50 and the second input terminal is connected to the Line (L) terminal of the AC power source 50. The filter circuit 105 is connected at an output end to the switch circuit 112. The filter circuit 105 comprises a low pass filter for reducing errors and improving electromagnetic interferences (EMI). Thus, according to one embodiment the filter is an EMI filter. According to other embodiments, the filter circuit 105 may be omitted. Thus the rectifier circuit 120 is connected directly to the AC power source 50. If the filter circuit 105 is implemented, the output of the filter circuit 105 is connected with the input of the rectifier circuit 120 via the switch circuit 112 when the switch thereof is in an "on" state.

Figure 3:
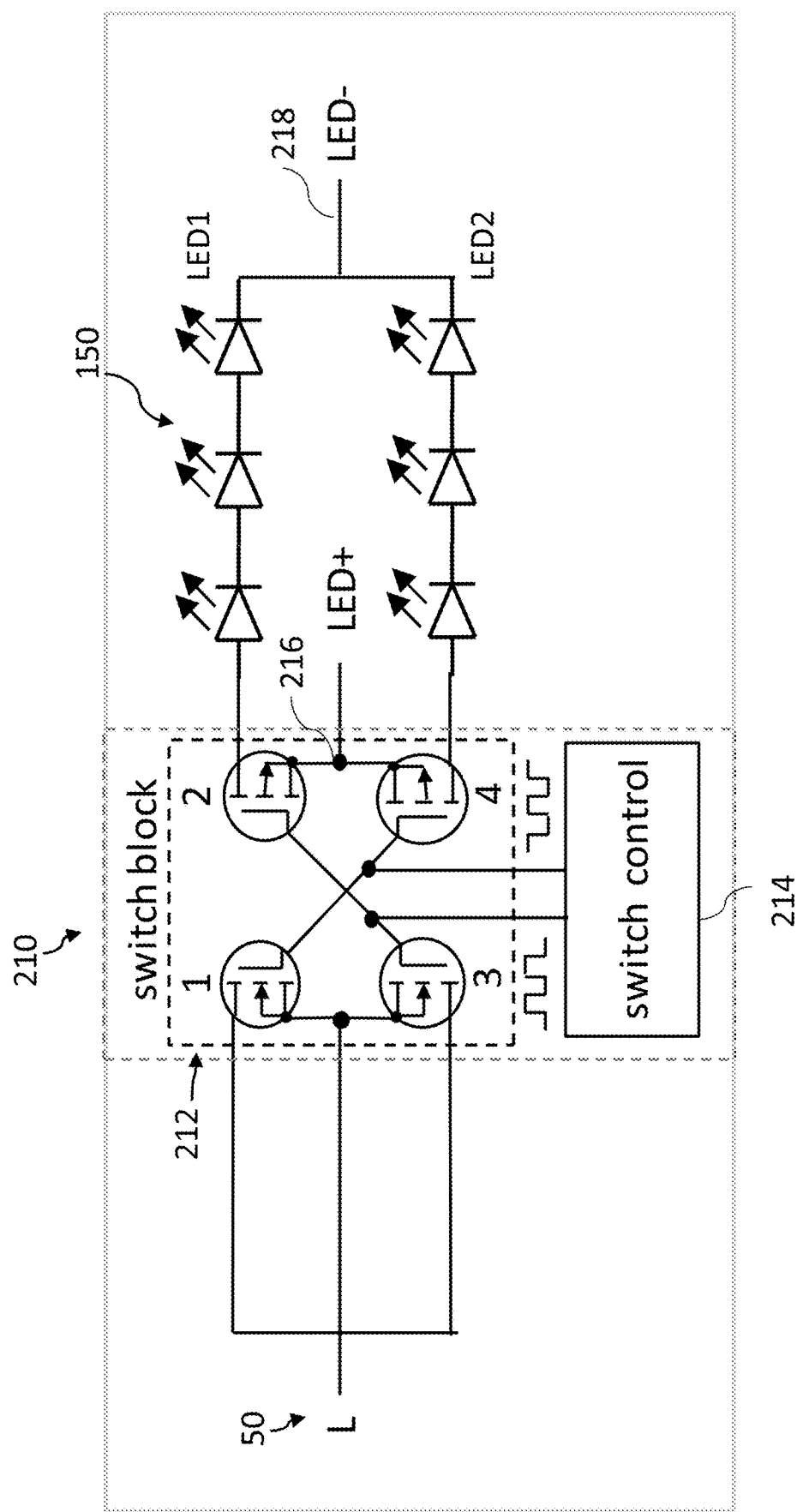
FIG. 3 is a circuit schematic illustration of an input-output synchronous switch system according to one or more alternative exemplary embodiments of the present invention.
Figure 5:
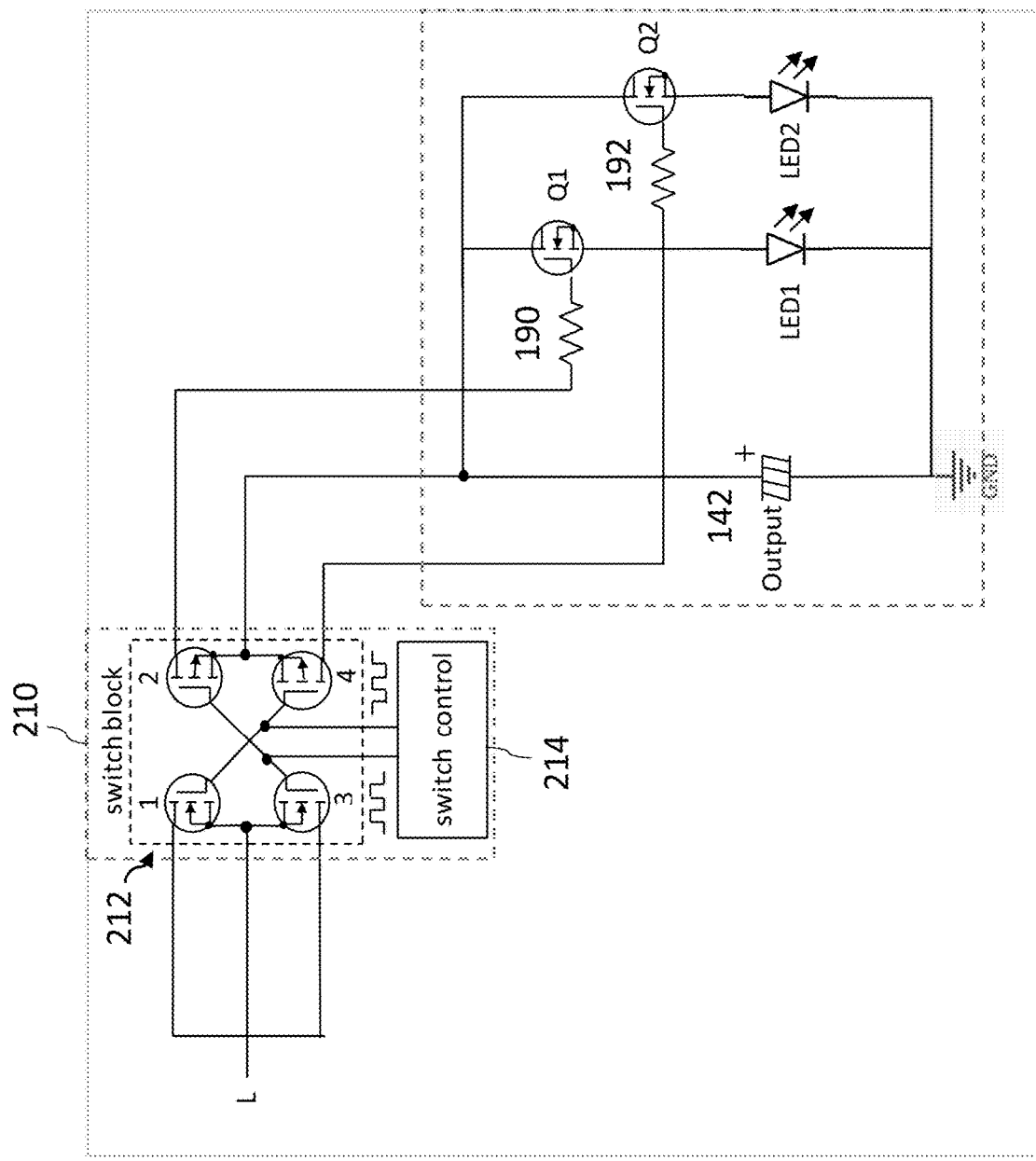
FIG. 5 is a circuit schematic illustrating the LED load connection mode implemented via the input-output synchronous switch system of FIG. 3, that can be implemented in one or more exemplary embodiments of the present invention.

According to an embodiment of the present invention, as shown in FIG. 2, the input-output synchronous switch system 110 is connected to the input and the output of the lighting driving circuit 100, synchronously. It includes the switch circuit 112 comprising a two-way switch (SW1, SW2) according to one or more embodiments. However, the present invention is not limited hereto, the switch circuit 112 can also comprise switches of DPDT (double pole double throw switch) or logical module (as depicted in FIGS. 3 and 5 according to alternative embodiments) or discrete version.

In FIG. 2, the switch circuit 112 includes a first connection terminal A1, a second connection terminal B1, a third connection terminal C1, a fourth connection terminal A2, a fifth connection terminal B2 and a sixth connection terminal C2. The first connection terminal A1 is connected to the third connection terminal C1 and the output of the filter circuit 105. The second connection terminal B1 is connected to an input end of the rectifier circuit 120 and the input end of the discharge circuit 160. The fourth connection terminal A2 is connected to the positive terminals (anodes) of the LEDs of the channel LED1. The fifth connection terminal B2 is connected to the positive terminal of an output capacitor 142 of the power output 140. The output capacitor 142 is an electrolytic (polarized) capacitor according to one or more embodiments.

The sixth connection terminal C2 is connected to the positive terminals of the LEDs of the channel LED2. An output end of the rectifier circuit 120 is connected to an input end of the power conversion circuit 130. The negative terminals (cathodes) of the LEDS of the channels LED1 and LED2 are connected to the negative terminal of the output capacitor 142 and to ground (GND).

According to embodiments the present invention, the power conversion circuit 130 can be a switching mode power conversion device e.g., an isolation and non-isolation device such as Buck, Buck-Boost, Fly-back, Boost. Alternatively, the power conversion circuit 130 can be a linear circuit or any constant current/voltage LED driver. The present invention is not limited to any particular type of power conversion device, and may vary. The power conversion circuit 130 is configured to transform the rectified input power to output power to be used by the LEDs of the channels LED1 and LED2 directly.

According to an embodiment, the discharge circuit 160 is provided to rapid discharge of the output capacitor 142 as power is turned off, to thereby ensure there is no inrush current passing through the LED channels LED1 and LED2 of the LED load 150 when turn on quickly during fast cycle. During the fast cycle, the LED lighting system is turned on and off at a high frequency. The discharge circuit 160 includes the power-off sense circuit 162 having an input end connected to an input of the rectifier circuit 120 and an output end connected to an input end of the discharge control circuit 154. An output end of the discharge control circuit 164 is connected to an input end of the discharge switch circuit 166 and an output end of the discharge switch circuit 166 is connected to the power output 140.

The power-off sense circuit 162 includes a diode 170, a resistor 172, a Zener diode 173 acting as a voltage regulator, and a capacitor 174. The power-off sense circuit 162 is power-off detection device that may also comprise discrete components or a logical module. The logic module may include a microcontroller unit or some other logical IC. According to one or more embodiments, the input voltage sense point (P1 or P2) for supplying a sense signal to be sent to the power-off sense circuit 162 may be in front of the rectifier bridge of the rectifier circuit 120 at point P1 or behind the rectifier bridge at point P2 via a bus (not shown) so that the input power to the discharge circuit 160 may be AC or DC power according to one or more embodiments. The voltage at P1 is AC voltage and the voltage at P2 is DC voltage. The connection from the power-off sense circuit 162 to P1 and to P2 are the same, thus as long as it can be directed that there is no power in the system 100, the power-off sense circuit 162 will stop operating.

The discharge control circuit 164 includes an optocoupler 176 having four pins. Alternatively, a relay, thyristor or logic module or any other signal isolated components can be implemented.

Further, the discharge switch circuit 166 includes a switching device 178 and a plurality of resistors 180, 182 and 184. According to one or more embodiments, the switching device could be a MOSFET, a triode, combination switch, or any other type of switching device suitable for the purposes set forth herein.

A first pin (1) of the optocoupler 176 is connected to one end of the capacitor 174, the negative pole of the Zener diode 173 and one end of the resistor 172. The other end of the resistor 172 is connected to a cathode end of the diode 170 and an anode end of the diode 170 is connected to the rectifier circuit 120 and the second connection terminal B1 of the switch circuit 112. The second pin (2) of the optocoupler 176 is connected to the other end of the capacitor 174 which is connected to ground (GND) along with an anode end of the Zener diode 173.

The third pin (3) of the optocoupler 176 is connected to the gate of the switching device 178 and one end of the resistor 180 and the resistor 182. The other end of the resistor 182 is connected between the drain of the switching device 178 and the positive terminal of the electrolytic capacitor 142. The fourth pin (4) of the optocoupler 176 is connected to the other end of the resistor 182, one end of the resistor 184 while the other end of the resistor 184 is connected to the source of the switching device 178.

Color temperature is a light performance parameter of the LEDs in the channels LED1 and LED2 of the LED load 150, the lower color temperature is yellow while the higher color temperature is white.

In operation, when the switch circuit 112 is closed at SW1 and SW2, the power output 140 is connected to the AC power source 50. During input and output synchronous switching, the power-off sense circuit 162 receives input power-off signal that triggers the discharge circuit 160. The discharge circuit 160 then controls the discharge switch circuit 166 via the discharge control circuit 164 to discharge the output capacitor(s) 142 through the resistance (i.e., resistors 180, 182, 184) of the discharge switch circuit 166. The resistance series along with the output capacitor 142 and switching device 178 can snubber or suppress the large discharge current.

Specifically, when switch circuit 112 is closed (in a state 1), the LED channel LED1 is in an "on" state, a power-off sense signal is simultaneously transmitted to the power-off sense circuit 162 of the discharge circuit 160 and the optocoupler 176 is in an "on" state and pulls down the gate-to-source voltage of the switching device 178 to be in an open state. Therefore, according to this embodiment, whenever the switch circuit 112 is closed, the discharge circuit 160 remains in an open state. When the switch circuit 112 is in a state 2, any LED channel LED1 or LED2, or LED 3 (shown in FIG. 1) is in an open state. As a result, the discharge circuit 160 does not receive the power-off sense signal, the optocoupler 176 is in an open state, the switching device 178 is forced on, and the output capacitor 142 is discharged through the resistance. In state 3, there is neither an input nor an output signal, therefore the system 100 is not working.

FIG. 3 is a circuit schematic illustration of an input-output synchronous switch system 210 according to one or more alternative exemplary embodiments of the present invention. As shown in FIG. 3, the switch system 210 comprises electrical components including a switch circuit 212 comprising a double pole double throw relay switch, and a switch control unit 214 comprising a logic module for logically controlling the switch circuit 212.

As shown, the switch circuit 212 includes four (4) switching contacts (MOSFETs 1, 2, 3, 4). MOSFETs 1, 3 are connected together and to the L terminal of the AC power source 50. MOSFETs 2, 4 are connected together at 216 and to the positive terminals of the LED channels LED1 and LED2. The negative terminals of the LED channels LED1 and LED2 are connected together at 218. The gates of the MOSFETs 1, 2, 3, 4 are controlled by the switch control 214.

The switch circuit 212 functions in a similar manner as the switch circuit 110 of FIGS. 1 and 2, to control power to the LED channels LED1 and LED2 and to synchronously send power off sense signals to the discharge circuit 160. Additional details will be discussed below with reference to FIG. 5. There are four MOSFETs (1,2,3,4) in switch circuit 212, which work alternately and there are also three states: state 1: MOSFET (1,4) turn on, MOSFET (2,3) turn off, and one of the LED loads turns on (LED1); state 2: MOSFET (2,3) turn on, MOSFET (1,4) turn off, one of the LED loads turns on (LED2); MOSFET (1,2,3,4) turn off, and LED load all disconnect.

Figure 4:
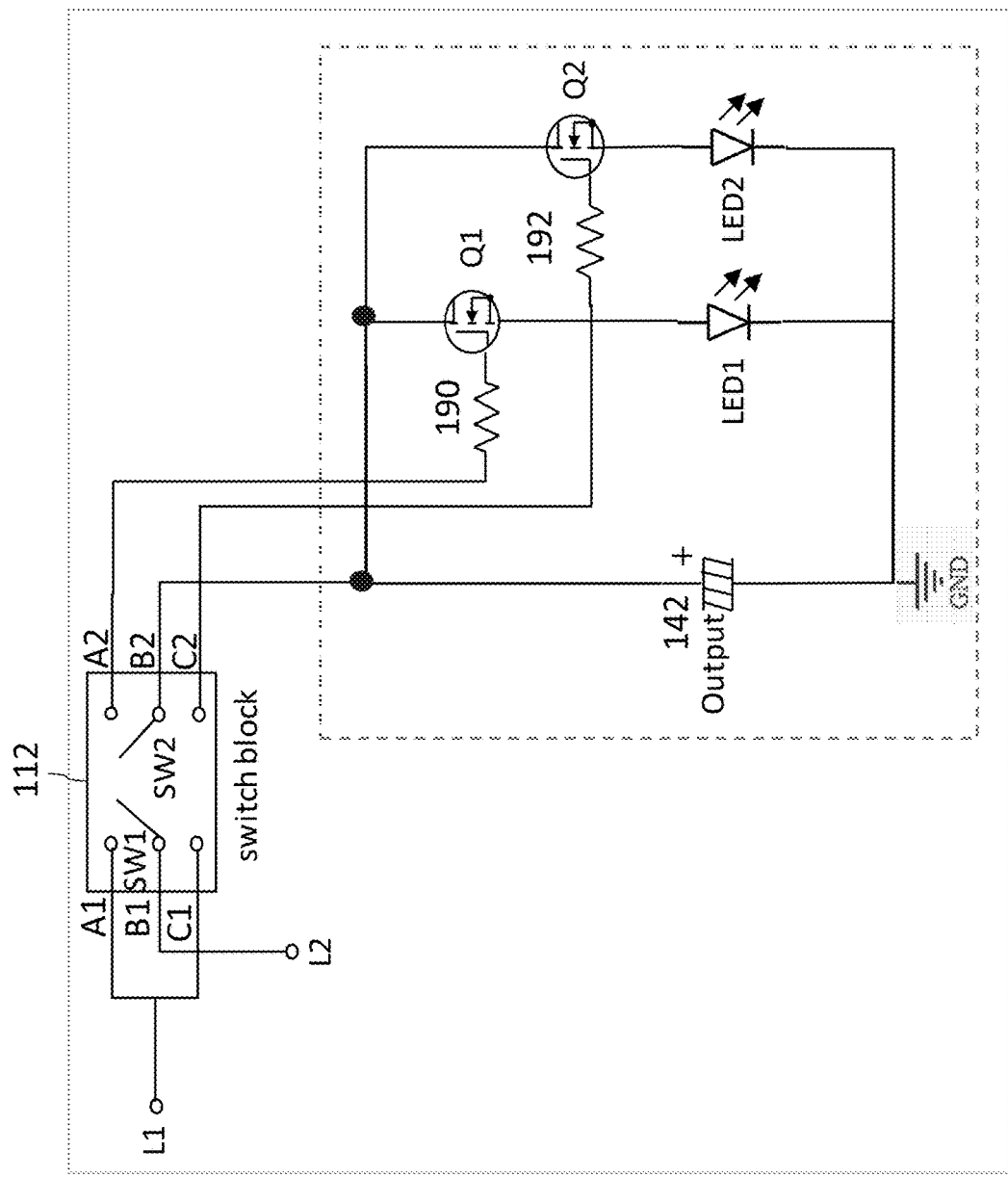
FIG. 4 is a circuit schematic illustrating the LED load connection mode implemented via the input-output synchronous switch system of FIG. 1, that can be implemented in one or more exemplary embodiments of the present invention.

FIG. 4 is a circuit schematic illustrating the LED load connection mode implemented via the input-output synchronous switch system 110 of FIG. 1, that can be implemented in one or more exemplary embodiments of the present invention. As shown in FIG. 4, the first connection terminal A1 and third connection terminal C1 are connected to a line 1 (L1) of the AC power source 50 through the output of the filter circuit 105 (depicted in FIG. 2).

The second connection terminal B1 is connected at line 2 (L2) to the rectifier circuit 120 and the power-off sense circuit 162 of the discharge circuit 160 (also depicted in FIG. 2). The fourth connection terminal A2 is connected to one end of a resistor 190 and the other end of the resistor 190 is connected to a gate of a switching device Q1 which may be a MOS transistor. The source of the switching device Q1 is connected to the positive terminal of the LED channel LED1 and the drain is connected to the positive terminal of the output capacitor 142.

The fifth connection terminal B2 is connected to the positive terminal of the output capacitor 142. The sixth connection terminal C2 is connected to one end of a resistor 192 and the other end of the resistor 192 is connected to a gate of a switching device Q2 which may also be a MOS transistor. Similar to the switching device Q1, the source of the switching device Q2 is connected to the positive terminal of the LED channel LED2 and the drain of the switching device Q2 is connected to the positive terminal of the output capacitor 142.

Each switching device Q1 and Q2 is connected in series with a respective LED channel LED1 and LED2 to effectively prevent a respective LED channel from being turned off immediately when the input power is turned off due to excessive output capacitance. When one of the LED channels LED1 or LED2 is switch one of the LED channels LED1 and LED2 is disconnected from the output power first and the other one is not connected to the output power and is instead, in an output disconnect state for a transient period of time. This occurs since the power of the output capacitor 142 cannot be discharged over a short period of time. At the output, the positive pole of 142 is connected to B2 of 122, 190 and 192 are connected to A2 and C2 of 112 respectively (190 and A2 connect, 192 and C2 connect, or 190 and C2 connect, 192 and A2 connect). At the same time, each switching device Q1 and Q2 are connected in series with LED1 and LED2 respectively, and are connected in parallel with 142. At the input, one end of the input is connected to A1 and C1 of switch circuit 112 and the LED driver is connected to B1.

FIG. 5 is a circuit schematic illustrating the LED load connection mode implemented via the input-output synchronous switch system 210 of FIG. 3, that can be implemented in one or more exemplary embodiments of the present invention. The configuration of the circuit shown in FIG. 5 is similar to that of FIG. 4 with exception of implementation of the switch system 210 in place of the switch system 110 shown in FIG. 2. Therefore, the detailed description of the various similar components has been omitted.

As shown in FIG. 5, the contact 2 is connected at one end to the resistor 190 and the other end of the resistor 190 is connected to the gate of the switching device Q1. Further, the contact 4 is connected at one end to the resistor 192 and the other end of the resistor 192 is connected to the gate of the switching device Q2.

Similar to the configuration shown in FIG. 4, In FIG. 5 when one of the LED channels LED1 or LED2 is switched, one of the LED channels is disconnected from the power first and another one is not yet connected to the input power and is in an output disconnect status for a transient period of time since the power on the output capacitor 142 cannot be discharged in a short time. At the output, the positive pole of 142 is connected to the gate of MOSFETs 2, 4 in switch circuit 212, 190 and 192 are connected to the drain of MOSFET 2 connect, 192 and the drain of MOSFET 4, or 190 and the drain of MOSFET 4 connect, 192 and the drain of MOSFET 2 connect. At the same time, each switching device Q1 and Q2 are connected in series with LED1 and LED2 respectively and are connected in parallel with 142. At the input end, one end of the input is connected to the drain of MOSFET 1, 3 in switch circuit 212 and the driver is connected to the gate of MOSFET 1, 3 in the switch circuit 212.

Figure 6:
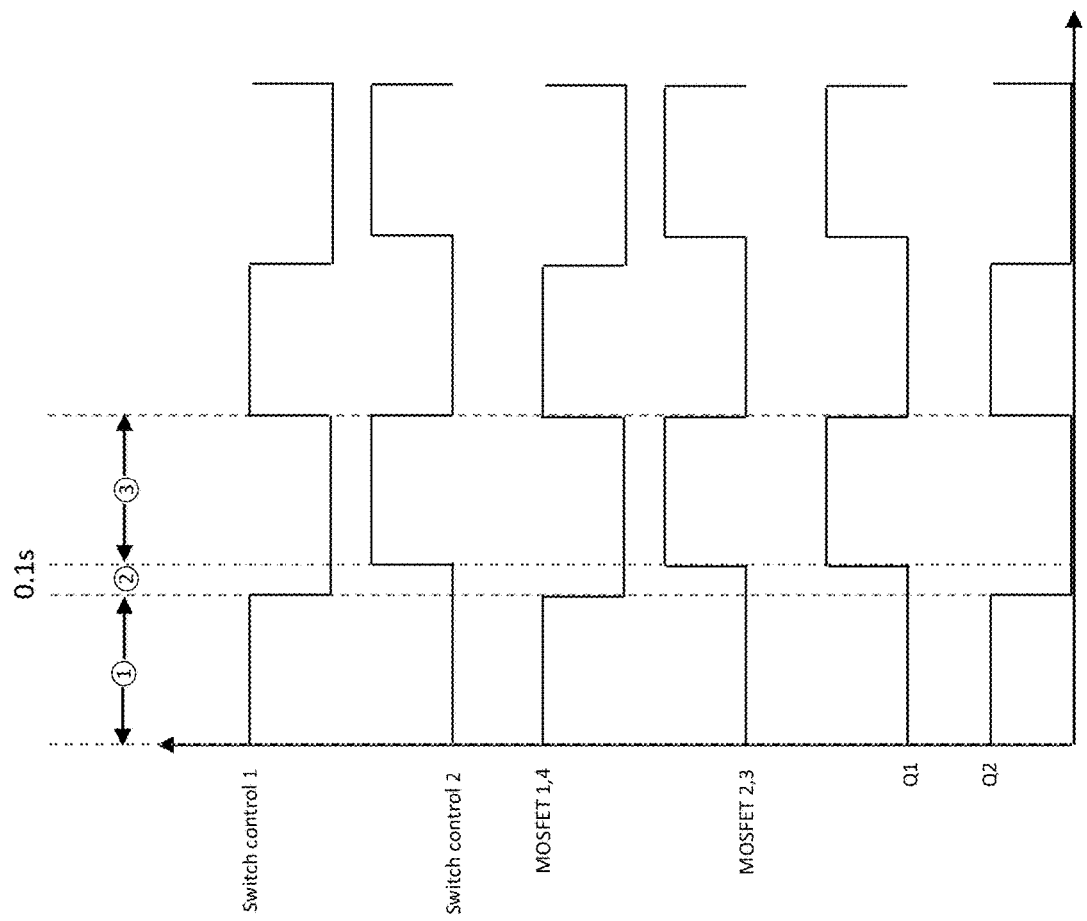
FIG. 6 is a graph representation illustrating the signal control within the switch system of FIG. 5 that can be implemented within one or more exemplary embodiments of the present invention.

As shown in FIG. 6, the input signal is controlled by MOSFET 1, 3 respectively and the output signal is controlled by MOSFET 2, 4, respectively. Stage 1 shown, the MOSFET 1, 4 in the switch circuit 212 is turned on (MOSFET 2, 3 are turned off), Q2 is on, LED2 is connected to the output at output capacitor 142 (as shown in FIG. 5). At stage 2, MOSFETs 1, 2, 3 and 4 are turned off, the system is not working and the transient time is approximately 0.1 seconds. At stage 3, MOSFETs 2, 3, in switch circuit 212 are turned on (MOSFETs 1, 4 are turned off), Q1 is on, LED1 is connected to output at the output capacitor 142. Switch controls 1 and 2, control the turn-on and turn off of the MOSFETs 1, 2, 3, 4 in switch circuit 212.

Some of the advantages of embodiments of the present invention, include the discharging of the output capacitor to remove the inrush current during color switching operation of LED channels that can be caused by overvoltage protection (OVP), and the independent operation (decoupling) of the input-output synchronous switch circuit and discharge circuit from the remaining lighting control components so as to not impact the normal operation or electrical performance of the lighting system. Further, the system and method of the present invention does not require a large amount of extra components and therefore maintains low cost for implementation within an existing lighting system.

This written description uses examples to disclose the invention, including the best mode, and also to enable any person skilled in the art to practice the invention, including making and using any devices or systems and performing any incorporated methods.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting driving circuit for supplying power to an LED load comprising a plurality of LED channels, the lighting driving circuit comprising:
    an input-output synchronous switch system including a switch circuit and synchronously connected to an input and an output of the lighting driving circuit, wherein the switch circuit comprises one of a two-way switch or a double-pole double-throw switch;
    a rectifier circuit comprising a rectifier bridge for converting AC power to DC power;
    a power conversion circuit connected to an output end of the rectifier circuit for conversion of the DC power; and
    a power output comprising an output capacitor connected to an output end of the power conversion,
    wherein the plurality of LED channels are coupled to the power output and the switch circuit of the input-output synchronous switch system, and the switch circuit is configured to simultaneously perform a switching operation of the power supplied to the plurality of LED channels to remove any inrush current to the LED load.

2. The lighting driving circuit of claim 1, wherein when the switch circuit comprises the double-throw switch the switch circuit further comprises a switch control module to logically control the operation of the switch circuit.

3. The lighting driving circuit of claim 1, wherein the switch circuit includes first, second, third, fourth, fifth and sixth connection terminals wherein the first connection terminal is connected to the third connection terminal and coupled to an input terminal, the second connection terminal is connected to an input end of the rectifier circuit, the fourth connection terminal is connected to positive terminals of lighting elements of a first LED channel of the plurality of LED channels, the fifth connection terminal is connected to a positive terminal of the power output, and the sixth connection terminal is connected to positive terminals of a lighting elements of a second LED channel of the plurality of LED channels.

4. The lighting driving circuit of claim 3, wherein negative terminals of the first and second LED channels are connected to a negative terminal of the power output.

5. The lighting driving circuit of claim 3, further comprising a discharge circuit is connected to the second connection terminal of the switch circuit and an input end of the rectifier circuit, wherein the discharge circuit is configured to receive a power-off sense signal from the switch circuit and perform a rapid discharge of the output capacitor as power is turned off, to thereby prevent inrush current passing through the first and second LED channels when turned on quickly during a fast cycle.

6. The lighting driving circuit of claim 5, wherein the discharge circuit comprises:
    a power-off sense circuit for receiving the power-off sense signal from the switch circuit and connected to the input end of the rectifier circuit;
    a discharge control circuit comprising an optocoupler connected to an output end of the power-off sense circuit; and
    a discharge switch circuit connected to an output end of the discharge control circuit and the discharge switch circuit being connected to the power output.

7. The lighting driving circuit of claim 6, wherein the power-off sense circuit comprises: a diode, a resistor, a Zener diode being a voltage regulator, and a capacitor.

8. The lighting driving circuit of claim 7, wherein the discharge switch circuit comprises a switching device, and first, second and third resistors.

9. The lighting driving circuit of claim 8, wherein a first pin of the optocoupler is connected to one end of the capacitor, a negative pole of the Zener diode and one end of the resistor, and the other end of the resistor is connected to a cathode end of the diode and an anode end of the diode is connected to the rectifier circuit and the second connection terminal of the switch circuit, to receive the sense-off signal at the power-off sense circuit.

10. The lighting driving circuit of claim 9, wherein a second pin of the optocoupler is connected to the other end of the capacitor which is connected to ground along with an anode end of the Zener diode; a third pin of the optocoupler is connected to a gate of the switching device and one end of a first resistor and a second resistor of the plurality of resistors, the other end of the second resistor is connected between a drain of the switching device and a positive terminal of the output capacitor; and a fourth pin of the optocoupler is connected to the other end of the second resistor, one end of a third resistor while the other end of the third resistor is connected to a source of the switching device.

11. The lighting driving circuit of claim 10, wherein when the switch circuit is closed, the power output is connected to the AC power source and during input and output synchronous switching, the power-off sense circuit receives the power-off sense signal to actuate the discharge circuit, wherein the discharge circuit then controls the discharge switch circuit via the discharge control circuit to discharge the output capacitor through the first resistor of the discharge switch circuit.

12. The lighting driving circuit of claim 11, further comprising:
fourth and fifth resistors; and
first and second switching devices, wherein the fourth connection terminal is connected to one end of a fourth resistor and the other end of the fourth resistor is connected to a gate of a first switching device, a source of the switching device is connected to a positive terminal of the first LED channel and a drain thereof is connected to the positive terminal of the output capacitor, the fifth connection terminal is connected to the positive terminal of the output capacitor, and the sixth connection terminal is connected to one end of a fifth resistor and the other end of the fifth resistor is connected to a gate of a second switching device wherein a source of the second switching device is connected to the positive terminal of the second LED channel and a drain thereof is connected to the positive terminal of the output capacitor, wherein when one of the first or second LED channels is switch on, the other of the first or second LED channels is disconnected from input power first and the other of the first or second LED channels is not connected to the input power and is in an output disconnect state for a transient period of time while power to the output capacitor is being discharged.

13. The lighting driving circuit of claim 1, wherein the power conversion circuit comprises a switching mode power conversion device including one of a Buck, Buck-Boost, Fly-back or Boost type converter.

14. A lighting driving circuit for supplying power to an LED load comprising a plurality of LED channels, the lighting driving circuit comprising:
an input-output synchronous switch system including a switch circuit and synchronously connected to an input and an output of the lighting driving circuit;
a rectifier circuit coupled to an input power source, comprising a rectifier bridge for converting AC power to DC power;
a power conversion circuit connected to an output end of the rectifier circuit for conversion of the DC power;
a power output comprising an output capacitor connected to an output end of the power conversion circuit; and
a discharge circuit coupled to the switch circuit and an input end of the rectifier circuit and to a terminal of the power output,
wherein the plurality of LED channels are connected to the power output and the switch circuit of the input-output synchronous switch system, and the switch circuit is configured to simultaneously perform a switching operation of the power supplied to the plurality of LED channels to remove any inrush current to the LED load and sends a power-off sense signal to the discharge circuit to discharge the output capacitor.

15. The lighting driving circuit of claim 14, wherein the switch circuit includes first, second, third, fourth, fifth and sixth connection terminals wherein the first connection terminal is connected to the third connection terminal and the output end of the input power source, the second connection terminal is coupled to an input end of the rectifier circuit, the fourth connection terminal is connected to positive terminals of lighting elements of a first LED channel of the plurality of LED channels, the fifth connection terminal is connected to a positive terminal of the power output, and the sixth connection terminal is connected to positive terminals of a lighting elements of a second LED channel of the plurality of LED channels.

16. The lighting driving circuit of claim 15, wherein negative terminals of the first and second LED channels are connected to a negative terminal of the power output.

17. The lighting driving circuit of claim 16, wherein the discharge circuit is connected to the second connection terminal of the switch circuit and an input end of the rectifier circuit, wherein the discharge circuit is configured to receive a power-off sense signal from the switch circuit and perform a rapid discharge of the output capacitor as power is turned off, to thereby prevent inrush current passing through the first and second LED channels when turned on quickly during a fast cycle.

18. The lighting driving circuit of claim 17, wherein when the switch circuit is turned on, the power conversion circuit is connected to the AC power source and during input and output synchronous switching, a power-off sense circuit of the discharge circuit receives the power-off sense signal to actuate the discharge circuit, wherein the discharge circuit then controls a discharge switch circuit via a discharge control circuit of the discharge circuit to discharge the output capacitor.

19. A method comprising:
synchronously connecting an input-output synchronous switch system including a switch circuit and to an input and an output of a lighting driving circuit;
connecting a plurality of LED channels to a power output and the switch circuit, and simultaneously performing a switching operation via the switch circuit, of power supplied to the plurality of LED channels to remove any inrush current to the LED load; and
connecting a discharge circuit between an input of a rectifier circuit connected to the switch circuit, and the power output, and sending a power-off sense signal to the discharge circuit to discharge an output capacitor at the power output.

* * * * *